Nov. 4, 1924.

K. BUSCH 1,514,431

COMBINATION EMERGENCY WHEEL AND NONSKIDDING DEVICE

Filed Feb. 17, 1923      3 Sheets-Sheet 1

Witnesses:

Inventor:
Kasimir Busch
By Joshua R. H. Potts
his Attorney

Nov. 4, 1924.
K. BUSCH
1,514,431
COMBINATION EMERGENCY WHEEL AND NONSKIDDING DEVICE
Filed Feb. 17, 1923    3 Sheets-Sheet 2
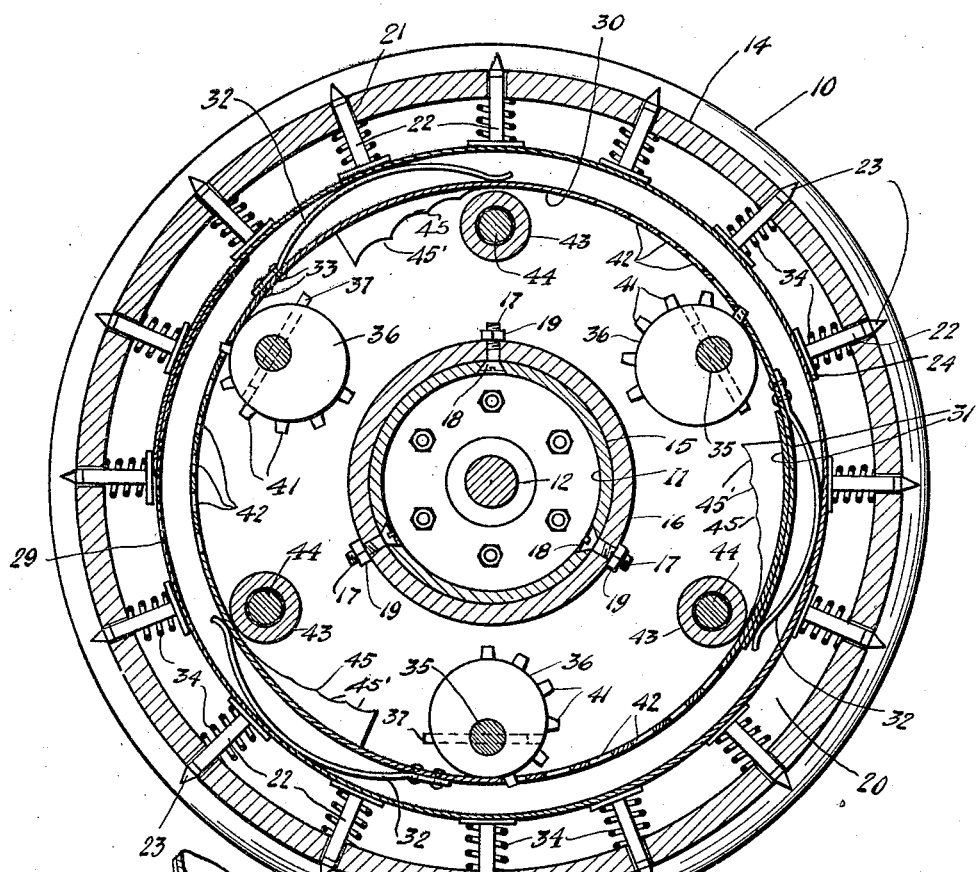
Fig. 2
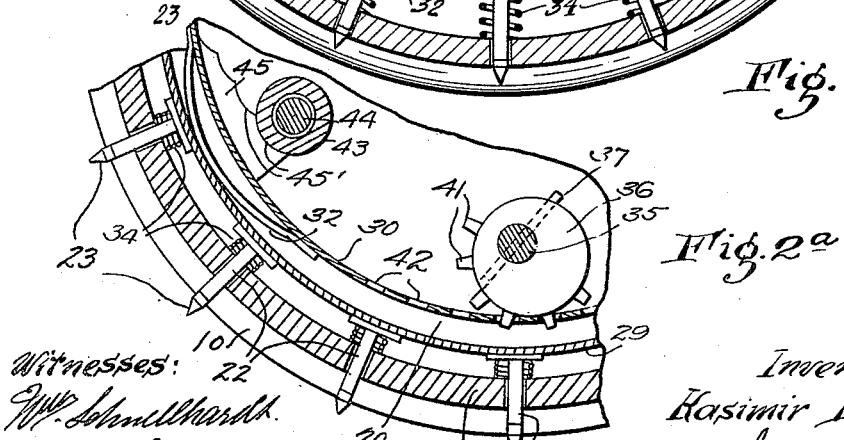
Fig. 2ª
Witnesses:
Inventor:
Kasimir Busch
By Joshua H. Horn
His Attorney Nov. 4, 1924. 1,514,431
K. BUSCH
COMBINATION EMERGENCY WHEEL AND NONSKIDDING DEVICE
Filed Feb. 17, 1923 3 Sheets-Sheet 3
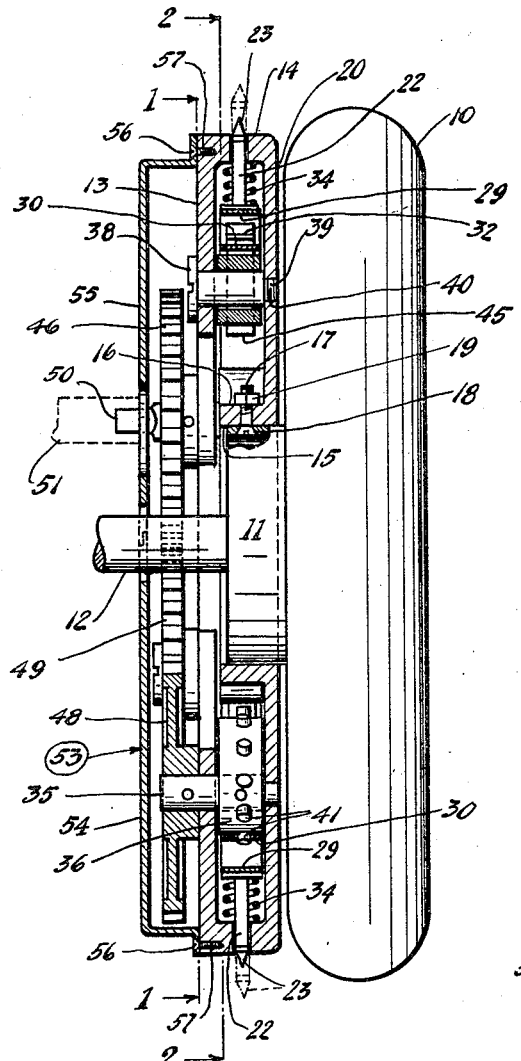
Witnesses:
Inventor:
Kasimir Busch
By his Attorney Patented Nov. 4, 1924.

1,514,431

UNITED STATES PATENT OFFICE.

KASIMIR BUSCH, OF CHICAGO, ILLINOIS.

COMBINATION EMERGENCY WHEEL AND NONSKIDDING DEVICE.

Application filed February 17, 1923. Serial No. 619,736.

*To all whom it may concern:*

Be it known that I, KASIMIR BUSCH, a citizen of the United States, and a resident of the city of Chicago, county of Cook, and State of Illinois, have invented certain new and useful Improvements in a Combination Emergency Wheel and Nonskidding Device, of which the following is a specification.

My invention relates to a combination emergency wheel and non-skidding device, and has for its principal object the provision of an improved construction of this character which will be highly efficient in use and simple in structure.

Other objects will appear hereinafter.

The invention consists in the combinations and arrangements of parts hereinafter described and claimed.

The invention will be best understood by reference to the accompanying drawings forming a part of this specification, and in which, Fig. 1, is a detail view of the invention taken substantially on line 1—1 of Fig. 3;

Fig. 2, is a sectional view of the invention taken substantially on line 2—2 of Fig. 3;

Fig. 2ª is a fragmentary view of the invention with the road engaging elements in extended position;

Fig. 3, is an edge view of a vehicle wheel showing the invention associated therewith, the invention being shown in section;

Fig. 4, is an elevational view, partly in section, of one of the skid preventing elements;

Fig. 5, is a top plan view of the same; and,

Fig. 6, is a side elevational view of the invention looking toward the vehicle wheel.

Figure 1:
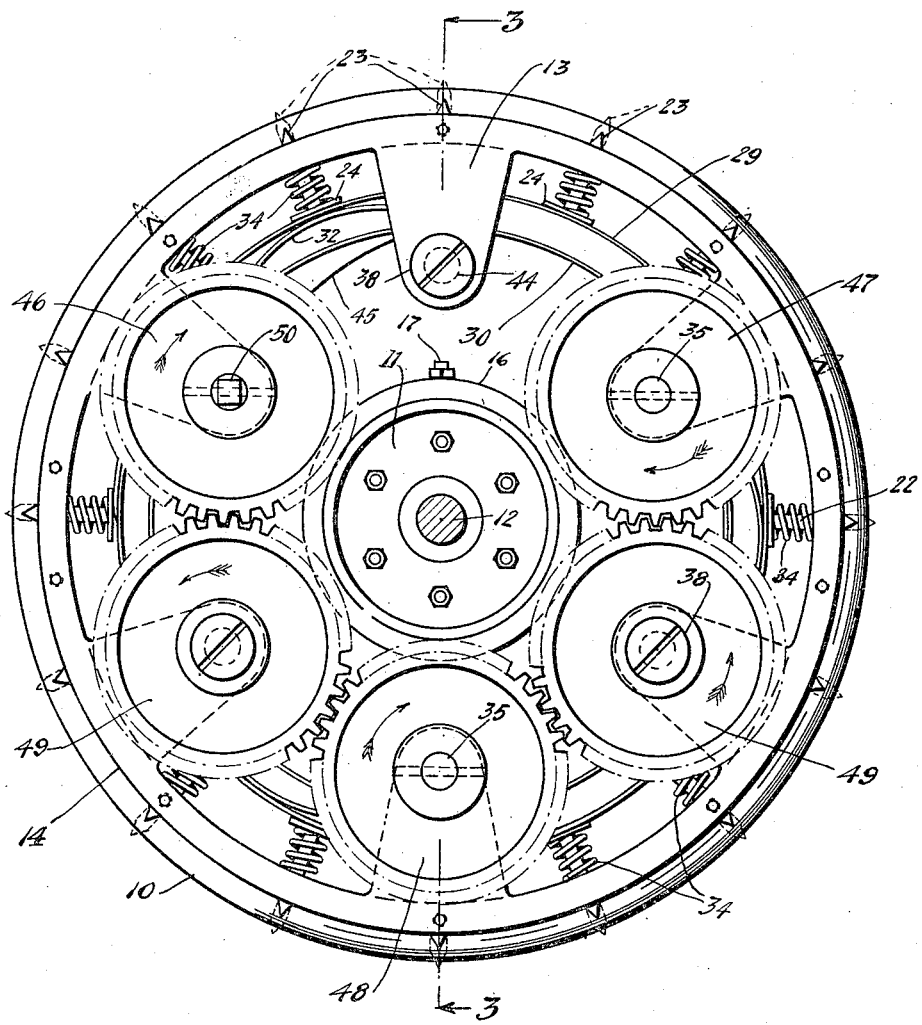

In attaining the objects of the invention and with reference to the drawings showing the preferred form of construction, 10 indicates a vehicle wheel of the pneumatic tire type, 11 indicates the brake band box, and 12 indicates the rear axle of the vehicle.

This arrangement illustrated and the elements so far described are found to be a part of any approved type of automobile and these elements mentioned constitute no part of the present invention, but are merely mentioned in order that the invention will be more fully understood.

My improved combination emergency wheel and non-skidding device includes a hollow circular member 13 having a flat edge 14, and provided with a central opening 15 formed by an inwardly turned annular flange 16. The member 13 is preferably fixed to the brake band box 11 by bolts 17 having counter sunk heads 18 passing through the flange 16 and fixed in position by nuts 19. When the member 13 is secured to the brake band box 11 through the medium of the bolts 17 the side 20 of the member will be located adjacent the inner side of the wheel 10 and the diameter of the member will be such that the flat edge 14 will be located within the circumference of the tire of the wheel, as clearly shown in Fig. 3.

The construction so far disclosed, is such that should the pneumatic tire of the wheel be punctured or otherwise damaged, so as to render it unserviceable, the tire can be removed and the member 13 used temporarily as the wheel, the flat edge 14 serving as a rim.

Formed in the edge 14 and equally spaced apart are a plurality of apertures 21 extending radially with respect to the center of the member 13. Adapted to work in the apertures 21 are skid preventing elements 22. These elements 22, in the present instance, are preferably formed triangularly in cross section and provided with removable heads 23 and inner seats 24, as best illustrated in Fig. 4. The heads 23 are provided with annular recesses 25 and tapped sockets 26 for the reception of reduced portions 27 and threaded stud shafts 28 respectively.

The seats 24 are adapted to abut a split ring 29 of resilient material arranged within the member 13 and extending circumferentially with respect thereto. This ring 29 in cooperation with a second split ring 30 of resilient material is adapted to extend the elements 22 in an outward direction and normally retain them in the position shown in Fig. 2, and permit inward movement of the elements upon having inward pressure applied thereto; the ring 30 is located within the member 13 and extends circumferentially with respect to the ring 29 and is provided with overlapping end portions 31. Interposed between the members 29 and 30 are curved leaf springs 32, the purposes of which are to increase the resistance of the ring 29 as will be explained hereafter said springs 32 being fixed by suitable means, indicated at 33 to the ring 30. The seats 24 are normally held into abutting relation with the ring 29 by expansion springs 34, as best shown in Fig. 2.

Means is provided for varying the projection of the elements 22 beyond the edge 14, this means includes transversely positioned shafts 35 carrying eccentric discs 36 within the member 13 and fixed to the shafts 35 by pins 37, as best illustrated in Fig. 3. The discs 36 are provided with spaced teeth 41 adapted to work in elongated slots 42 formed in the ring 30 for reasons to be hereinafter mentioned.

Arranged in the member 13 and adapted for engagement with the inner surface of the ring 30 are rollers 43 carried by transversely extending shafts 44 provided with screw heads 38 and screw ends 39 threaded into openings 40. Adapted for wedging engagement against the rollers 43, are wedge shaped members 45 with indented seats 45' for retaining said rollers in active position said members being fixed to the ring 30 by any approved means.

Means is provided for simultaneously operating the discs 36, this means includes gears 46 and 47 and 48 mounted on the shafts 35 and meshing with idle gears 49 mounted on said shafts 44, adjacent heads 38 as best shown in Fig. 1. Formed on one, or on all if desired, on the shafts 35 is a square head 50 adapted to receive a key or other device having a square socket formed in the end thereof, said key being indicated in dotted lines at 51 in Fig. 3.

The gear arrangement above described is enclosed by a covering 53 comprising interlocked parts 54 and 55 having a lateral peripheral flange 56 affording means of attachment by means of screws 57 to the member 13, and provided with a central opening for the passage of the axle 12. This arrangement is to prevent dirt or other matter from working between the meshing teeth of the gears and other operative parts of the invention.

The operation of the device is as follows: As has already been stated the resilient rings 29 and 30 normally hold the elements 22 in extended position through the apertures 21. The distance of extension of these elements is controlled by the discs 36 for it is apparent that upon rotation of these discs through the medium of the key and gear arrangement the ring 30 will be caused to expand and in turn will expand the ring 29. This expansion of the ring 29 will apparently extend the elements 22 a greater distance through the apertures 21. Upon rotation of these discs 36 the teeth 41, working in the slots 42, will move the ring 30 circumferentially with respect to the member 13 and cause the wedges 45 to wedge against the peripheral surfaces of the rollers 44. The wedging action of the wedges 45 causes the ring 30 to expand and force the leaf springs 70 against ring 20 causing the same to expand and by reason of such expansion the non-skidding elements 23 are extended through the apertures 21. The wedges are preferably rotated with ring 30, so as to seat each roller 44 in one of the seats 45', and at the same time the leaf springs 32, interposed between the rings 29 and 30 will be under tension and force the wedges 45 against the peripheral surface of the rollers, securely retaining said rollers in said seats. These wedges when in wedging position with rollers 44 in seats 45', and with the cooperation of the members 32, prevent back slipping of the ring 30 when forced to expand by the discs 36. The teeth 41 of the discs also serve to prevent slipping of the ring 30 when the discs are rotated to bring about a further outward movement of the elements 22.

It will be apparent that the road contacting part of the pneumatic tire will be compressed and in order that the skid preventing elements 22 will function properly it becomes necessary that the length of projection be of such distance that will accommodate the depressed portion of the ground contacting portion of the tire, this distance being illustrated in Fig. 2, it being noted that the tips of the heads are slightly within the circumference of the tire.

When the vehicle, with which the invention is associated, travels over a paved road; in its regular directed course, the elements 22 instead of digging into the pavement will upon engagement therewith move inwardly a sufficient distance so as not to injure or otherwise damage the road pavement. The movement inwardly of the elements when traveling over a paved road is due to the fact that the heads of the elements do not have a sliding or scraping engagement with the pavement as is the case when the vehicle skids or slides. This function of the elements 22 is the opposite when the vehicle travels over a dirt road. When travelling over a dirt road it is often found that due to the looseness of the ground the tire treads of the tires will not grip the ground sufficiently to properly assure even and smooth travel. When such is the case, the elements 22 being capable of moving in extended position through the apertures 21 will dig into the road and serve as an auxiliary tread for the purposes above mentioned.

These elements serve to prevent skidding and sliding of the vehicle and when serving these functions, for example, when the vehicle skids sideways, the elements, having sliding or scraping engagement with the road, will be jammed against the adjacent surfaces of the apertures and due to friction will not move inwardly, the same being true when the vehicle slides, as is often the case when the wheels are locked by the brake mechanism; and when the brakes are suddenly applied to the rear wheels, the rear tires are consequently compressed at the ground engaging parts thereby causing elements 22 to project beyond said parts and dig into the roadway thus preventing skidding or sliding of the vehicle.

It is my intention of associating two of the devices, herein set forth, with a vehicle, each being located adjacent the inner side of the rear wheels.

When the member 13 is used as an emergency wheel the elements are drawn to such a position that the tips of the heads thereof will be within the outer circumference or in other words below the top edge 14, this drawing inwardly of the elements 21 being accomplished through the medium of the discs 36 and the gear arrangement above mentioned.

It is apparent that the function of my invention is two-fold, namely to serve as a skid preventing device and to serve as an emergency wheel and it is apparent from the description herein and with reference to the drawings, that the invention is simple in structure, and will be highly efficient in use.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

Having described my invention what I claim as new and desire to secure by Letters Patent is:

1. A structure of the class described including a hollow member having apertures formed in the peripheral edges thereof, elements mounted in said member to project through said apertures and being provided with seats on the inner ends thereof, resilient means extending across and engaging the inner ends of said seats, and means for expanding said resilient means to project said elements.

2. A structure of the class described including a hollow member having apertures formed in the peripheral edges thereof, elements mounted in said member to project through said apertures and having seats on the inner ends, a resilient annular member mounted within said hollow member and extending across the seats of said elements engaging the same, and means operative on said resilient member for projecting said elements.

3. A structure of the class described including a hollow member having apertures disposed about the peripheral edge thereof, elements having seats on the inner edge thereof and being mounted in said member to project through said apertures, a resilient ring arranged in said member and supporting said seats, resilient means arranged in said member and operative on said ring, and eccentric members operative on said resilient means for expanding the same and thereby expand said ring to vary the projection of said elements.

4. A structure of the class described including a hollow member having apertures disposed about the peripheral edge thereof, elements having seats on the inner edge thereof and being mounted in said member to project through said apertures, a resilient ring arranged in said member and supporting said seats, resilient means arranged in said member and operative on said ring, eccentric members operative on said resilient means for expanding the same and thereby expand said ring to vary the projection of said elements, and means for simultaneously rotating said eccentric members.

5. A structure of the class described including a hollow member having apertures disposed about the peripheral edge thereof, elements having seats on their ends and being mounted in said member to project through said apertures, a resilient member arranged in said hollow member and engaging said seats, resilient means arranged in said hollow member and operative on said resilient member, wedges carried by said resilient means, and means for moving said resilient means and wedges and for expanding said resilient means and thereby said resilient member to project said elements.

6. A structure of the class described including a hollow member having apertures disposed about the peripheral edge thereof, elements having seats on the inner ends and being mounted in said member to project through said apertures, a resilient member arranged in said hollow member and engaging said seats, springs on said elements to urge them inwardly against said resilient member, and means for expanding said resilient member and thereby project said elements.

7. A combination emergency wheel and non-skidding device including a hollow member having a flat peripheral edge with apertures, elements adapted to project through said apertures and having seats formed on the inner ends thereof, rollers transversely arranged within said member, a resilient member operative on the seats of said elements, resilient means operative on said resilient member, and means including wedge-shaped members engaging said rollers for expanding said resilient means to expand said resilient member and project said elements.

8. A combination emergency wheel and non-skidding device including a hollow member having a flat peripheral edge with apertures therein, elements mounted in said member to project through said apertures and having seats on the inner ends, rollers transversely arranged within said member, a resilient member operative on the seats of said elements, resilient means on said resilient member, wedge-shaped members movable with said means and operative on said rollers, and eccentric members operative on said resilient means to move it and said wedge-shaped members and to expand said resilient means and member to project said elements.

9. A combination emergency wheel and non-skidding device including a hollow member having a flat peripheral edge with apertures, elements mounted in said member to project through said apertures and having seats formed on their inner ends, rollers mounted within said member, a resilient member operative on the seats of said elements, a split ring with springs operative on said resilient member, wedges carried on said ring and operative on said rollers, eccentric members operative on said ring to move it with said wedges and expand it with said rings for projecting said elements, and means for simultaneously operating said eccentric members.

10. A combination emergency wheel and non-skidding device including a hollow member having a flat peripheral edge and apertures therein, a central annular flange on said member for mounting it on the brake band box of a vehicle wheel, elements in said member adapted to project through the apertures, a spring for urging each element inward, a resilient member engaging the inner end of each element and means for expanding said resilient member and projecting said elements.

In testimony whereof I have signed my name to this specification in the presence of two subscribing witnesses.

KASIMIR BUSCH.

Witnesses:
MARGARET AUER,
LOUISE SYMVOLT.